United States Patent Office 3,345,773
Patented Oct. 10, 1967

3,345,773
MULCH
John B. Sturgess, Altadena, and Carleton B. Scott, Los Alamitos, Calif., assignors to Union Oil Company of California, Los Angeles, Calif., a corporation of California
No Drawing. Filed Apr. 18, 1966, Ser. No. 543,019
8 Claims. (Cl. 47—9)

ABSTRACT OF THE DISCLOSURE

The invention comprises the use of carbonaceous solids as mulch to promote germination and growth of plants. The carbonaceous solids are applied as a continuous band or layer above the seed row and promote emergence by warming the soil, preventing crusting of the soil and by retaining moisture in the soil.

This application is a continuation-in-part of my copending application, Ser. No. 357,763 filed Apr. 6, 1964, now abandoned.

Description of the invention

This invention relates to a method for treating soil and in particular concerns a method for using carbon solids as a mulch in promoting seed germination and plant growth.

For rapid seed germination and plant growth, optimum conditions of temperature, soil moisture and tilth are necessary. Recently, it has been proposed that an asphalt coating be sprayed over a seed bed to function as a mulch by increasing the radiant heat absorptivity of the soil, thereby raising its temperature and accelerating seed germination and plant growth. U.S. Patents 3,061,974 and 3,061,975 disclose specific asphalt compositions and methods for their application to the soil to stimulate seed germination and plant growth in the manner described above.

In recent tests, it has been discovered that while the asphalt coating increases soil temperatures during daytime hours, the material has the disadvantage of reducing the soil temperature during the night hours. Additionally, the asphalt as applied presents a tacky surface and dust and dirt blown onto the asphalt adheres thereto and diminishes its heat absorption property.

It is an object of our invention to provide a process for promoting seed germination and plant growth.

It is a further object of this invention to provide a process for promoting seed germination and plant growth by increasing the radiant heat absorptivity of a seed bed.

It is an additional object of our invention to provide a process for promoting seed germination and plant growth by reducing the moisture loss to the atmosphere and thereby provide a high moisture content in the soil.

It is a further object of our invention to provide the aforementioned effects under field conditions and during day and night hours.

Still other objects of the invention will become apparent to those skilled in the art as the invention is better understood by reference to the detailed description appearing hereinafter.

We have discovered that the aforementioned objects can be achieved by applying a layer of subdivided carbon particles on the soil surface above seeds or around growing plants. The carbon particles impart several desired properties. The carbon solids layer above the seed prevents crusting of the soil so that seedlings can readily emerge therefrom. The prevention of soil crusting is particularly of value in sand and loam containing soils which are irrigated. These soils tend to form a hard crust which often can not be penetrated by young seedlings and this crusting tendency is intensified by commonly practiced sprinkler irrigation. The coke mulches therefore have a usefulness in these soils apart from soil warming and moisture retention effects. Additionally, the black carbon particles have a high radiant heat absorptivity and conduct the absorbed heat to the soil. The conduction of this heat to the soil can be promoted according to the preferred embodiment of our invention by compacting the carbon solids layer against the soil surface. Another quite unexpected effect is that soil beneath the carbon solids layer has a higher soil moisture content than does the unmulched soil.

It is desired that the carbon solids be in a finely divided condition for use in our invention; however, powders or dusts are not useful because they fail to provide a lasting effect. Generally, carbon particles having a particle diameter from 0.08 to about 0.50 inch; preferably from 0.12 to about 0.30 inch. Use of particles having lesser diameters is to be avoided as these particles are quickly lost, sifting into the soil and becoming eroded from the surface by wind or water. The use of particles of greater diameters is not desired because these solids are less effective and do not form a contiguous layer unless excessive thickness (greater than about 1½ inches) are used.

In its simplest embodiment, our invention thus comprises the application of a layer of finely divided carbon particles onto the soil prior to, during, or after the seeding of such soil. In its preferred form, the application of the carbon particles to the soil surface is accompanied by a compacting of the carbon particles as a layer against the soil surface. Additional modifications include the simultaneous application of a water impermeable barrier with the carbon solids layer to increase the moisture retention of the soil. The proportions of carbon solids applied to the soil and the manner of application of the solids to the soil is hereinafter set forth in greater detail.

This invention can be used to stimulate the germination and growth of almost all types of seeds and plants whether they be planted in rows or broadcast over a large area. Specific examples of such seeds and plants are: beans, beets, carrots, cantaloupes, corn, cotton, lettuce, onions, watermelon, strawberries, etc.

Various carbon solids can be used in our invention provided these solids have the particle size hereafter set forth. Examples of suitable carbon solids include coal, i.e., lignites, anthracites and bituminous coals and cokes derived from coals or from petroleum. Preferably coke solids are used because of their lower volatile matter content and greater hardness. As used herein, the term carbon solid is defined to include solids composed chiefly of carbon having less than about 25 weight percent volatile matter (determined by weight loss upon heating of the solids in an inert atmosphere to 1000° F.) and obtained from coal or petroleum sources.

Coke useful in our invention is in general a coherent, cellular, carbonaceous residue remaining from the destructive distillation of a coal or a hydrocarbon, e.g., petroleum and petroleum residues. Carbon is the principal constituent of coke, together with mineral matter and residual volatiles. Coke is produced from coal by the destructive distillation of the latter at temperatures from about 500° to 1200° C.; high temperature coke being produced at temperatures above 900° C.; medium temperature coke at temperatures from 750° to 900° C.; and low temperature coke at temperatures from 500° to 750° C. All of these types of coke can be used in the method of our invention.

Preferably, petroleum coke is employed in our invention. This material is the residue from the thermal coking of petroleum and petroleum residues. The crude from which the coke is produced governs the chemical composition of the material, e.g., high sulfur crude yields high sulfur coke, high metals content crude yields high metal content coke. Generally, however, petroleum cokes are characterized by a low ash content. The coke so produced is referred to as green petroleum coke containing various amounts of volatiles. This material can be employed in our invention, or can be calcined by heating to temperatures between about 1000° and about 3000° F. to remove the volatile matter. Hereafter the carbon solids will be described by reference to coke, however, this is for convenience and the description is likewise applicable to all the previously mentioned carbon solids such as the various coals.

The finely divided coke particles are applied as a layer over the soil that overlies a seed bed. Preferably, the finely divided coke is applied after the seed has been planted in the soil to avoid disrupting the coke layer by subsequent seeding operations. In practice, the coke layer can be applied and compacted in a single seeding operation by placing a coke applicator behind the gathering shoe on a conventional seeder and mounting a roller behind the coke applicator to roll the coke layer so applied. In some instances, the gathering shoe itself can be replaced by the coke applicator. The coke can be applied as a single layer over the entire seed bed, however, it is preferably applied as a narrow band covering only the seeded row. In another embodiment, the coke can be applied as periodic or discontinuous bands over the seed row to facilitate thinning operations. To illustrate, many crops are seeded in excess and after the plants have established a fair growth, they are thinned out. Because the coke layer promotes seed germination and rapid growth, it can be periodically applied to the soil, e.g., at 2 to about 6 inch spacings so as to selectively favor the growth of the plants at such intervals and thereby facilitate the thinning operation.

The thickness of the coke layer overlying the seed bed can vary according to the prevailing planting conditions such as the moisture content of the soil, type of plants being planted, etc. Generally the coke should form an uninterrupted layer, i.e., completely blanket the underlying soil wherein the individual coke particles are contiguous, i.e., are in contact with each other. Generally, thickness up to about 1½ inches can be used; preferably, thickness no greater than about ¾ inch and, most preferably, between about ⅛ and ¼ inch are employed. When row planting is desirable, the coke layer need only be spread over the row or rows of planted seeds as previously mentioned. The width of the coke band so spread over the seed row can be varied between about 1 and about 18 inches, preferably from about 2 to 12 inches and most preferably from about 2 to 4 inches. Table 1 sets forth a coke particle application rate for row planting as a function of the spacing between the rows and coke layer thickness.

TABLE 1

| Coke Layer, Width/Inches | Row Spacing, Feet | Layer Thickness, Inches | Tons/Acre |
|---|---|---|---|
| 2 | 3 | ⅛ | 0.6 |
| 2 | 3 | ¼ | 1.2 |
| 6 | 6 | ⅛ | 0.9 |
| 6 | 6 | ¼ | 1.9 |
| 6 | 3 | ⅛ | 1.9 |
| 6 | 3 | ¼ | 3.7 |

In many applications, seed beds are established with irrigation furrows between the seed rows. When the coke is to be applied to established plantings having such irrigation furrows, the finely divided coke particles can be spread as a contiguous layer along the sides of the irrigation ditch adjacent to the plants. This technique is well suited for use on established plantings such as strawberry plots. If desired, the application can be combined with a consolidating layer applied over the coke such as a film of plastic sheeting or an asphalt or petroleum resin film that consolidates the coke layer and retains it against the bank of the furrow. This technique additionally offers the advantage of increasing the moisture retention of the soil since the film constitutes water impermeable barrier in the mulch.

As previously mentioned, a preferred embodiment of our invention comprises the compacting of the coke layer onto the soil surface. The compacting can be accomplished by any well known method for compressing a mulch, e.g., rolling, stamping, impacting, etc. The compacting should be performed so as to insure good contact between the soil and coke layer. Care should be exercised, however, to avoid compressing of the coke layer beneath the soil surface where its blackening effect would be obscured; however, compacting the coke to compress it until it is flush with the soil renders it more resistant to wind and water erosion. The compacting is advantageous because it increases thermal conductivity to the soil and increases soil temperatures.

To maximize water infiltration into the seed row, we prefer to compact the coke layer with a roller having a center of greater diameter, e.g., formed from two truncated cones joined together at their bases. This roller will form a dished upper surface in the coke layer that will collect water. The diversion of water to the seeds can also be maximized by forming a V-shaped trough above the seed row into which the coke is poured. The apex of the V can be placed directly above the seed row to form a trough. Rainfall or other surface waters that percolate through the coke layer will be diverted to the seeds by the walls of the V-shaped trough. This embodiment is particularly useful when irrigation water is applied with sprinklers or other water broadcasting means.

An additional modification of our invention, as previously mentioned, is the use of a water impermeable material in combination with finely divided coke particles as a mulch. We have observed that the coke particles themselves provide a water barrier and reduce evaporation of moisture from the soil. This effect can be increased, however, by the application of various moisture barriers in combination with the coke. Any material that forms a water impermeable layer can be employed such as polyethylene sheeting, tar paper, and asphalt coatings. When polyolefin film is used the film can be protected by applying the coke layer above the film. In this manner, very thin films of 1 to about 5 mils thickness can be used. The sheeting and tar paper can be manually applied as a layer over the soil or over the coke particles. The asphalt can be applied directly on the soil surface and thereafter covered with the coke particles or the asphalt can be sprayed onto the coke particles during or after their application to the soil. The asphalt or petroleum resins and residues that can be applied comprise various cutback asphalts or residues that are diluted with a low boiling point solvent such as kerosene, naphtha, etc., or aqueous asphalt emulsions can be employed that comprise from about 10 to 50 weight percent water, the balance being asphalt and sufficient amounts of a suitable oil-in-water emulsifying agent, e.g., surfactants or clay. In another application, the asphalt and coke particles can be admixed prior to the application and thereafter the particles applied to the surface of the soil. In this modification, sufficient amount of asphalt should be employed so as to wet the surface of the coke particles and provide an asphaltic layer that will cement or consolidate the coke layer together. The coke, in finely divided form, e.g., 6 to 300 mesh, can also be admixed in the aforementioned asphalt emulsions, e.g., from about 3 to 50 weight percent coke can be stirred into the emulsions and the resultant slurry applied to the soil.

The following examples will illustrate a mode of practice of our invention and demonstrate the results obtainable thereby:

Example 1

Green petroleum coke having between about 1.7 and 9.0 weight percent of its particles with an average diameter larger than ¼ inch, from 46 to 72 weight percent of its particles with an average diameter less than ¼ inch and greater than 0.033 inch, and from 27 to 45 weight percent of its particles having an average diameter less than 0.033 inch and greater than 0.0015 inch was applied as a layer approximately ¼ inch thick on soil that contained thermocouples imbedded 2 inches below the soil surface. The soil temperatures were recorded at hourly intervals, beneath the coke layer and in the adjacent soil having no coke mulch. These temperatures were recorded for a one-week period and the average of the recorded temperatures is reported in the following table.

TABLE 2.—AVERAGE SOIL TEMPERATURE

| Time | Mulched | Non-Mulched | Difference |
| --- | --- | --- | --- |
| 1:00 p.m. | 76.4 | 70.6 | 5.8 |
| 3 | 77.7 | 71.2 | 6.5 |
| 5 | 73.4 | 67.4 | 6.0 |
| 7 | 67.6 | 62.8 | 4.8 |
| 9 | 65.0 | 60.9 | 4.1 |
| 11 | 62.5 | 59.2 | 3.3 |
| 1:00 a.m. | 60.6 | 57.5 | 3.1 |
| 3 | 58.8 | 56.2 | 2.6 |
| 5 | 57.2 | 54.6 | 2.6 |
| 7 | 55.8 | 53.2 | 2.6 |
| 9 | 58.0 | 55.2 | 2.8 |
| 11 | 68.4 | 63.5 | 4.9 |

The table demonstrates that the coke mulch effected an average 4.1° F. increase in the soil temperature throughout the 24-hour period. Coal particles having a similar size distribution could be applied to the soil in the previously described fashion to achieve comparable results.

Example 2

Sugar beets were seeded in rows approximately 30 inches apart with irrigation furrows disposed between the seed rows. The seed rows were established in the crest between the furrows and the aforementioned green petroleum coke fines were applied to the seed rows in separate bands having thicknesses of ⅛ inch and ¼ inch. In separate bands, various band widths were tested, varying from about 6 inches to approximately 2 inches, the latter being just sufficient to fill the depression formed directly over the seeded row by the gathering shoe of the seeder. In all applications the coke layer was compacted to the soil by rolling the layer. After two weeks, the field was inspected and the seedlings had grown approximately ½ to ¾ inch above the coke layer. No seedlings were apparent above the surface of the ground in the unmulched seed rows. The seedlings in the rows mulched with the narrow band, i.e., about 2 inches in width, of coke were observed to be approximately the same size as those in the wider, 6 inches, band of coke. The seedlings mulched with the ¼ inch thick layer of coke were slightly more advanced in growth than those mulched with the ⅛ thick layer. The unmulched soil forms a hard crust; however, the soil beneath the coke layer remained loose and unconsolidated.

Example 3

Comparative tests were performed employing a coke mulch and an asphalt emulsion mulch of the type described in the aforementioned patents. Irrigation furrows were spaced approximately 30 inches apart and the crest between the irrigation furrows was employed as the seed row. Thermocouples were buried 2 inches beneath the ground surface in the crest between the irrigation ditches. The mulches were applied in test strips approximately 6 inches wide and 20 feet long. The coke was applied in a thickness between about ½ and ⅜ inch. The field was irrigated one day after the application of the mulch. During the ensuing week the soil temperatures were recorded at periodic intervals and the average of the soil temperatures so recorded are reported in the following table.

TABLE 3

| Test Strip | Time of Day ||||||||| |
| --- | --- | --- | --- | --- | --- | --- | --- | --- | --- |
|  | 12 p.m. | 2 p.m. | 4 p.m. | 6 p.m. | P.M. Avg. | 12 a.m. | 2 a.m. | 4 a.m. | 7 a.m. | A.M. Avg. |
| Non-mulched | 89.1 | 95.1 | 95.6 | 88.7 | 92.1 | 70.6 | 67.8 | 65.8 | 64.1 | 67.0 |
| Green Coke [1] | 90.1 | 96.5 | 95.6 | 89.3 | 92.9 | 71.2 | 68.5 | 66.4 | 64.6 | 67.7 |
| Emulsified Asphalt | 95.9 | 105.0 | 104.8 | 95.0 | 100.2 | 71.0 | 67.8 | 65.5 | 63.4 | 66.9 |

[1] Not compacted.

The preceding data indicate that although the emulsified asphalt mulch provides a very satisfactory daytime thermal effect, its effect is lost during night time hours since the soil beneath the asphalt tends to cool to the same or slightly lower temperature than the untreated soil. In contrast, the green coke mulch at all times exhibited a positive thermal effect even though it had not been compacted in the preferred manner. A comparison of the data with that reported in Example 1 demonstrates that a greater thermal effect can be achieved by compacting the coke in the manner described in that example to secure a more substantial thermal effect, in the range from about 3° to 10° F., throughout the day and night hours.

Soil cores were also taken at 2 inch depths from the sand strips and the cores were analyzed for their average moisture content. These cores were taken at periodic times after the start of the test and the data on soil moisture is reported in the following table.

TABLE 4

| Days of Test | Non-Mulched | Green Coke | Emulsified Asphalt |
| --- | --- | --- | --- |
| 4 | 16.46 | 16.66 | 16.44 |
| 9 | 9.58 | 10.02 | 10.27 |
| 13 | ([1]) | ([1]) | ([1]) |
| 17 | 9.86 | 10.56 | 10.94 |
| 21 | 6.35 | 7.09 | 6.73 |

[1] Rain.

The data thus indicate that the coke mulch provides a measurable increase in moisture retention in the soil.

Example 4

Several different sizes of coke particles were used in a series of experiments with different vegetable crops. The screen analysis of the coke samples was as follows:

| Avg. Particle Diameter | Coarse | Medium | Fine |
| --- | --- | --- | --- |
| Greater than 0.25 inch | 2.0 |  | 0.4 |
| 0.25 to 0.125 inch | 16.6 |  | 4.2 |
| 0.125 to 0.167 inch | 21.2 | 26.1 | 5.4 |
| 0.167 to 0.033 inch | 11.9 | 14.6 | 2.1 |
| 0.033 to 0.0082 inch | 29.4 | 36.2 | 29.7 |
| 0.0082 to 0.0058 inch | 5.1 | 6.1 | 17.6 |
| Less than 0.0058 inch | 13.8 | 17.0 | 40.6 |

The fine grade of coke was of a dust particle size, e.g., see the size distribution and definition of coal dust set forth on page 12 of The Bureau of Mines publication 5624 (1960) "Laboratory Equipment and Test Procedures for Evaluating Explosibility of Dusts."

The cokes were applied to test seed beds in the Salinas Valley, Calif., in several experiments. The effect on lettuce germination in a clay loam was determined by placing the seeds into a depression in the soil about ½ inch in depth and 1 inch width. The seeds were then covered with a ½ inch layer of the coke material under investigation. The test plots were sprinkled with commercial irrigation equipment. During the test it was observed that the fine grade of coke would ball up when the area was sprinkled. The fine grade of coke also tended to disappear into the soil.

the mulched seedlings preceded the unmulched seedlings in emerging above ground. Plant size is reported as the average percentage increase in size of the mulched plants over the size of the unmulched plants.

*Example 6*

The effect of coke mulch on soil moisture was determined by filling small flower pots with moist soil. The soil in separate pots was then covered with the medium grade and the coarse grade of coke reported in Example 5 at coke layer thicknesses of ¾ and 1½ inches. The moisture content of the soil in the pots was determined periodically and the results are shown in the following table:

TABLE 5

| Sample | Coke Grade | Layer Thickness | Soil Moisture After Indicated Days | | | | | | | | |
|---|---|---|---|---|---|---|---|---|---|---|---|
| | | | 0 day | 2 days | 4 days | 6 days | 8 days | 10 days | 12 days | 14 days | 16 days |
| 1 | None | | 35 | 20 | 15 | 11.5 | 8.5 | 7 | 5 | 3.5 | 3 |
| 2 | Medium | ¾ | 38 | 34 | 30.5 | 28 | 26 | 23.5 | 21.5 | 20 | 18 |
| 3 | do | 1½ | 42 | 38.5 | 36.5 | 35 | 33.5 | 33 | 31.5 | 30 | 28 |
| 4 | Coarse | ¾ | 35 | 32 | 28.5 | 26 | 23 | 21 | 18.5 | 16.5 | 13.5 |
| 5 | do | 1½ | 36.5 | 35 | 33 | 31.5 | 30 | 28.5 | 27 | 25 | 23.5 |

This experiment demonstrates the effect of the coke particles in prevention of soil crusting. The test was performed when the soil temperature was above the minimum necessary for germination and the thermal effect of the particles on germination was thereby minimized. The soil, however, tended to crust, i.e., form a hard surface layer which resisted penetration by the seedlings. It was observed that the coke mulch prevented the formation of the crusting and its effect is reported in the following table as a percentage increase in number of emerging seedlings of the mulched area over those of the unmulched area.

LETTUCE

Coke size:  Germination, percent of check
    Coarse ---------------------------------- 290
    Medium ---------------------------------- 160
    Fine ------------------------------------ 160

The checking seedlings had a covering of soil ½ inch in thickness.

*Example 5*

The cokes described in Example 4 were tested as mulches for tomato seed beds in the Sacramento Valley, Calif. The beds were sown with tomato seeds when at an average temperature of 55° F. (2 inch depth). This temperature is several degrees below the minimum temperature for optimum germination and, accordingly, this test evaluated the thermal effect of the coke solids. The cokes were applied over the seed row at 3 tons per field acre in a band 5 inches in width and ¼ inch in depth. The fine grade of coke sifted into the soil and disappeared shortly after application. The following table summarizes the results:

TOMATOES

| Coke Size | Germination, percent | Germination Rate | Increase in Plant Size |
|---|---|---|---|
| Coarse | 200 | 4 days early | 250%. |
| Medium | 200 | 4 days early | 250%. |
| Fine | 120 | Same as check | Same as check. |

The germination is reported as percent increase in seedlings over that observed in the unmulched area. The germination rate is reported as the number of days by which The soil moisture results are reported in grams of water in the soil. The wilting point of the soil was 15 grams water and it can be seen that use of the coke mulch extended the time for the soil to reach this moisture level from 4 to in excess of 16 days for the medium grade and the coarse grade at 1½ inches depth. Similar improvements can be achieved with lesser thickness of the coke, e.g., approximately 9 and 14 days would be required for the soil to reach the wilt point when covered with ¼ and ½ inch thick layers, respectively, of the medium grade coke.

The preceding examples are intended solely to illustrate the practice of our invention and to demonstrate results secured thereby. These examples are not intended to unduly limit the invention which is intended to be defined only by the steps and their obvious equivalents set forth in the following method claims.

We claim:

1. A method to promote germination of seeds and growth of plants in soil which comprises sowing said seeds in said soil and applying particulate carbon solids having diameters between about 0.08 and 0.50 inch on the soil to provide said carbon solids in a layer above said seeds having a thickness from about ⅛ inch to about 1½ inches.

2. The method of claim 1 wherein said seeds are sown in substantially parallel rows and said carbon solids layer is applied in bands of one to about 18 inches above said parallel rows.

3. The method of claim 1 wherein said carbon solids have a diameter from 0.12 to about 0.30 inch.

4. The method of claim 1 wherein said solids are applied as a layer having a thickness between about ⅛ and ¾ inch.

5. The method of claim 4 wherein said layer of finely divided solids is compacted against the soil surface.

6. The method of claim 1 wherein said carbon solids are particles of coke.

7. A method to promote the growth of plants in soil which comprises spreading a layer of particulate carbon solids having diameters between about 0.08 and 0.50 inch on said soil to provide a layer from ⅛ to ¾ inch thickness of carbon solids in contiguous particle to particle contact about said plants.

8. The method of claim 7 wherein a layer of water impermeable material is placed in communication with said layer of solids, to provide a plurality of layers over the soil.

References Cited

UNITED STATES PATENTS 1,864,672 6/1932 Rose et al. _____ 47—9
1,882,377 10/1932 Whittelsey _____ 47—9

OTHER REFERENCES

Coal Dust for Alaskan Gardens, Bensin, 1952.
Some Consequences of Bituminous Mulches, January 1963, p. 1.

ABRAHAM G. STONE, *Primary Examiner.*
ROBERT E. BAGWILL, *Examiner.*